United States Patent
Mutsuda et al.

(10) Patent No.: US 11,066,529 B2
(45) Date of Patent: Jul. 20, 2021

(54) WATER-SOLUBLE MATRIX, PRE-MOLDED ARTICLE CONTAINING RESIN PARTICLES, AND METHOD FOR PRODUCING RESIN PARTICLES

(71) Applicant: DAICEL-EVONIK LTD., Tokyo (JP)

(72) Inventors: Mitsuteru Mutsuda, Tokyo (JP); Yoshiki Nakaie, Tokyo (JP); Hiroaki Arita, Tokyo (JP)

(73) Assignee: DAICEL-EVONIK LTD., Tokyo (JP)

( * ) Notice: Subject to any disclaimer, the term of this patent is extended or adjusted under 35 U.S.C. 154(b) by 77 days.

(21) Appl. No.: 16/615,571

(22) PCT Filed: Jun. 6, 2018

(86) PCT No.: PCT/JP2018/021640
§ 371 (c)(1),
(2) Date: Nov. 21, 2019

(87) PCT Pub. No.: WO2018/230404
PCT Pub. Date: Dec. 20, 2018

(65) Prior Publication Data
US 2020/0207931 A1    Jul. 2, 2020

(30) Foreign Application Priority Data
Jun. 16, 2017 (JP) .............................. JP2017-119049

(51) Int. Cl.
*C08J 3/16* (2006.01)
*C08L 29/04* (2006.01)

(52) U.S. Cl.
CPC ................. *C08J 3/16* (2013.01); *C08L 29/04* (2013.01); *C08J 2331/04* (2013.01); *C08J 2477/06* (2013.01)

(58) Field of Classification Search
CPC ....... C08J 3/16; C08J 2329/04; C08J 2429/04
See application file for complete search history.

(56) References Cited

FOREIGN PATENT DOCUMENTS

JP    09165457 A  *  6/1997
JP    2006328219 A  *  12/2006

OTHER PUBLICATIONS

Machine translation of JP-2006328219-A (Year: 2006).*
Machine translation of JP-09165457-A (Year: 1997).*
English translation of international Preliminary Report on Patentability and Written Opinion dated Dec. 26, 2019, in PCT/JP2018/021640 (Forms PCT/IB/338, PCT/IB/373, and PCT/ISA/237).
U.S. Appl. No. 16/615,464, filed Nov. 21, 2019.

* cited by examiner

*Primary Examiner* — Wenwen Cai
(74) *Attorney, Agent, or Firm* — Birch, Stewart, Kolasch & Birch, LLP

(57) ABSTRACT

Provided are: a water-soluble matrix whose melt-kneading temperature can be adjusted according to the melting point or glass transition temperature of a resin; a pre-molded article in which resin particles are dispersed in the water-soluble matrix; and a method for producing resin particles. This production method includes melt-kneading a water-soluble matrix containing a modified polyvinyl alcohol-based resin and a water-soluble saccharide at a weight ratio of the former/the latter=from 99/1 to 50/50 and a thermoplastic resin, and bringing the pre-molded article in which the resin particles are dispersed into contact with an aqueous solvent to elute the matrix. The modified polyvinyl alcohol-based resin contains in a side chain thereof an alkyl group including at least one hydroxyl group (for example, a 1,2-dihydroxyalkyl group).

11 Claims, 1 Drawing Sheet

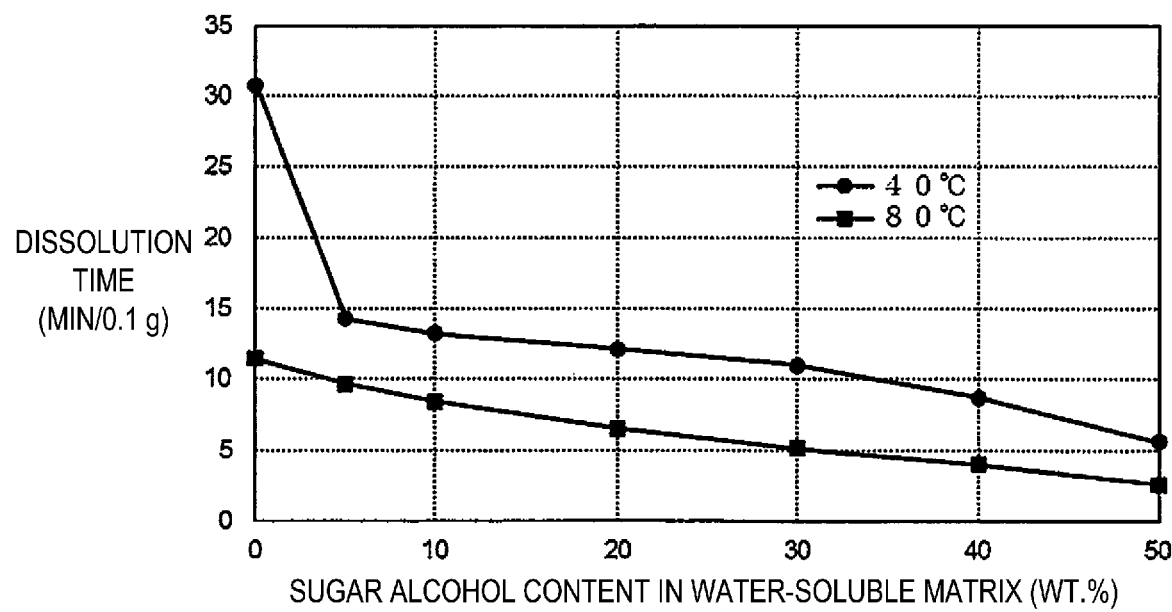

WATER-SOLUBLE MATRIX, PRE-MOLDED ARTICLE CONTAINING RESIN PARTICLES, AND METHOD FOR PRODUCING RESIN PARTICLES

TECHNICAL FIELD

The present invention relates to a water-soluble matrix (a matrix composition or a matrix component) useful for producing spherical resin particles (such as thermoplastic resin particles) having excellent surface smoothness, a pre-molded article in which resin particles are dispersed in the matrix, and a method for producing resin particles from the pre-molded article.

BACKGROUND ART

Resin particles have properties that inorganic particles do not have and are used widely in the fields of, for instance, light diffusing agents, matting agents, lubricants, anti-blocking agents, cosmetics, light blocking agents, toners, fillers, ceramics void forming materials, and fiber-reinforced composite materials. Methods for producing such resin particles include a method known in the art, the method involving: melt-kneading a melt-kneadable water-soluble component and a non-water-soluble thermoplastic resin to prepare a molded article in which the thermoplastic resin is dispersed in particulate form in a matrix of the water-soluble component; and then eluting the water-soluble component from this molded article to collect resin particles.

For example, JP 60-13816 A (Patent Document 1) describes: melt-stirring polyethylene glycol and a thermoplastic resin; introducing the mixture into water to solidify both the polymers; and removing polyethylene glycol with water to produce thermoplastic resin particles. Probably because of the low crystallization temperature of polyethylene glycol, however, a melt-kneaded product of polyethylene glycol and a thermoplastic resin have an extremely slow solidification rate by cooling, and the product is maintained in a rice cake-like form for a long time, thus reducing the handleability thereof and the productivity of the resin particles. Furthermore, if a thermoplastic resin including a functional group is used, a peroxide generated during the kneading process at elevated temperature may react with the thermoplastic resin or the functional group thereof and change the concentration of the functional group in the resulting resin particles. For example, if a polyamide-based resin is used, resin particles having a reduced amino group concentration and an increased carboxyl group concentration may be formed. This limits the application of the resin particles.

JP 2005-162840 A (Patent Document 2) describes a method for producing particles of an organic solid component, the method involving: melt-kneading a meltable organic solid component (A) and a water-soluble auxiliary component (B) containing at least an oligosaccharide (B1); and eluting the auxiliary component (B) from a formed dispersion to produce particles of the organic solid component (A); wherein the water-soluble auxiliary component (B) contains a water-soluble plasticizing component (B2), such as a sugar alcohol. JP 2006-328219 A (Patent Document 3) describes a method for producing spherical composite resin particles, the method involving: melt-kneading a meltable non-water-soluble resin (A), a water-soluble resin (B), and a water-soluble emulsifying medium (C) that is non-miscible with the resin (A) to form a dispersion; and dissolving at least the emulsifying medium (C) of the dispersion with water to produce spherical composite resin particles containing the water-soluble resin (B); wherein the water-soluble resin (B) is a vinyl alcohol-based resin, and the emulsifying medium (C) contains an oligosaccharide (C1) and a sugar alcohol (C2).

In these methods, however, the oligosaccharide and the sugar alcohol, which has low heat resistance, are easily scorched at elevated temperature, and thus it may be difficult to melt-knead them with a thermoplastic resin having a high melting point or glass transition temperature to form resin particles. In addition, probably because the thermoplastic resin and the matrix (the water-soluble auxiliary component or the emulsifying medium) are non-miscible, and the matrix contains a low molecular weight saccharide, a small amount of the melt-kneaded product is entangled with a screw of an extruder, thus a discharge rate from the extruder cannot be improved, and if the discharge rate is increased, oddly shaped particles, such as thready particles, and the like are formed. Thus, the productivity of the resin particles cannot be improved. Furthermore, if a content of the thermoplastic resin relative to the matrix is increased, oddly shaped particles and the like are formed, and thus the content of the thermoplastic resin cannot be increased. Still more, the melt-kneaded product is in the form of flakes, thus the fluidity is low, and the handleability is reduced.

JP 09-165457 A (Patent Document 4) describes a method for producing resin fine particles, the method involving: mixing a melt-moldable water-soluble polymer (A) (an oxyalkylene group-containing polyvinyl alcohol-based resin) and a thermoplastic resin (B) at a mixed weight ratio of (A)/(B)=from 99/1 to 30/70 to obtain a melt-molded product; and then bringing the molded product into contact with water to remove the water-soluble polymer (A) and to produce the resin fine particles.

However, the polyvinyl alcohol-based resin typically has a melting point close to the thermal decomposition temperature, and thus the melt-kneadable temperature range is narrow, reducing the molding processability. Furthermore, it is difficult to improve the elution property in water. Thus, further improvement in melt moldability and water solubility is desired.

CITATION LIST

Patent Document

Patent Document 1: JP 60-13816 A (Claims, Examples)
Patent Document 2: JP 2005-162840 A (Claims, Examples)
Patent Document 3: JP 2006-328219 A (Claims, Examples)
Patent Document 4: JP 09-165457 (Claims)

SUMMARY OF INVENTION

Technical Problem

Accordingly, an object of the present invention is to provide a water-soluble matrix (a matrix composition or a matrix component) that has improved water solubility and can be eluted with water, and has improved melt moldability, in which the melt-kneading temperature of the matrix can be adjusted in a wide range according to the melting point or glass transition temperature of a resin; a pre-molded article (or a dispersion) in which a resin is dispersed in particulate form in the water-soluble matrix; and a method for producing resin particles.

Another object of the present invention is to provide a water-soluble matrix (or matrix composition) and a pre-molded article that are useful for producing resin particles of a thermoplastic resin by melt-kneading without changing functional group concentration of the thermoplastic resin, and a method for producing the resin particles.

Still another object of the present invention is to provide a water-soluble matrix (or matrix composition) that is melt-kneadable even if the content of the resin particles is increased; a pre-molded article; and a method that can efficiently produce the resin particles.

Another object of the present invention is to provide a water-soluble matrix (or matrix composition) that can increase the discharge rate and improve the production efficiency of the resin particles; a pre-molded article; and a method that can industrially advantageously produce resin particles.

Yet another object of the present invention is to provide a water-soluble matrix (or matrix composition) that can be molded into an easily handled form, such as pellet; a pre-molded article; and a method for producing resin particles.

Solution to Problem

As a result of diligent research to achieve the above objectives, the present inventors found that a modified polyvinyl alcohol-based resin into which a predetermined functional group is introduced has melt moldability in a wide temperature range; such a polyvinyl alcohol-based resin forms a miscible system with a saccharide to form a water-soluble matrix (or a matrix composition or a matrix component) that is melt-kneadable in a wide temperature range by a ratio of the two; such a water-soluble matrix has high water solubility and efficiently forms thermoplastic resin particles by melt-kneading even if a content of a thermoplastic resin is high; still more, such a water-soluble matrix, even if melt-kneaded with a thermoplastic resin including a functional group, such as an amino group, can maintain the functional group concentration; and completed the present invention.

That is, in the method according to an embodiment of the present invention, resin particles are produced by bringing a pre-molded article (or a dispersion) in which resin particles are dispersed in a water-soluble matrix into contact with an aqueous solvent to elute the matrix. In this method, the water-soluble matrix contains a water-soluble polyvinyl alcohol-based resin and a saccharide (water-soluble saccharide). In addition, the water-soluble polyvinyl alcohol-based resin contains a modified polyvinyl alcohol-based resin that is modified with a hydrophilic modifying group, and a side chain of this modified polyvinyl alcohol-based resin contains an alkyl group or alkyl chain including at least one hydroxyl group (one or more hydroxyl groups).

The modified polyvinyl alcohol-based resin may be modified with a modifying group including at least a primary hydroxyl group and may include in a side chain thereof a hydroxyl group-containing alkyl group or alkyl chain of (a1) and/or (a2) below.

(a1) an alkyl group including a primary hydroxyl group;

(a2) an alkyl group including a primary hydroxyl group and a secondary hydroxyl group.

The modified polyvinyl alcohol-based resin may contain a unit represented by Formula (1) below and may include in a side chain thereof a 1,2-diol structure (1,2-dihydroxyalkyl group). The modified polyvinyl alcohol-based resin may contain, for example, a unit represented by Formula (1-1) below.

[Chem. 1]

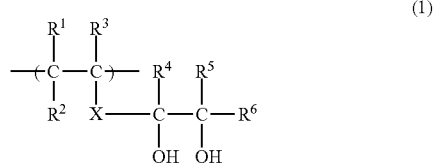

where $R^1$, $R^2$, $R^3$, $R^4$, $R^5$, and $R^6$ are the same or different and represent a hydrogen atom or an organic group; and X represents a single bond or a bonding chain.

[Chem. 2]

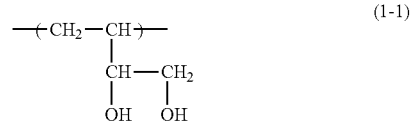

The resin particles may be formed of a thermoplastic resin having a glass transition temperature of, for example, 30 to 250° C. (for example, 50 to 250° C.). In addition, the resin particles may be resin particles including at least an amino group, for example, polyamide-based resin particles including an amino group and a carboxyl group.

A weight ratio of the modified polyvinyl alcohol-based resin and the saccharide may be, for example, the former/the latter=approximately from 99/1 to 50/50. By adjusting the ratio of the two, the melt-kneading temperature can be adjusted in accordance with the melting point/glass transition temperature of the thermoplastic resin. The volume average particle size of the resin particles may be, for example, 5 μm or greater.

The present invention also encompasses the pre-molded article (or the dispersion) and a matrix thereof. That is, the present invention encompasses a pre-molded article containing a water-soluble matrix, containing a water-soluble polyvinyl alcohol-based resin, and resin particles dispersed in this matrix; and also a water-soluble matrix containing a water-soluble polyvinyl alcohol-based resin that is used for dispersing resin particles (or a water-soluble matrix for dispersing a thermoplastic resin in particulate form by kneading). These water-soluble matrices contain the modified polyvinyl alcohol-based resin and a saccharide (water-soluble saccharide).

Advantageous Effects of Invention

In an embodiment of the present invention, even if the water-soluble matrix contains a polyvinyl alcohol-based resin, the resin is modified with a predetermined modifying group and is combined with a saccharide, and thus not only the matrix is highly eluted with water but also the melt moldability can be greatly improved, and the melt-kneading temperature and the molding processing temperature can be adjusted in a wide range. Thus, according to the type of resin (melting point or glass transition temperature), a pre-molded article which is a dispersed phase containing a thermoplastic resin (dispersed resin particles) dispersed in the water-soluble matrix can be formed by melt-kneading, and resin particles can be efficiently produced by eluting the water-soluble matrix with an aqueous solvent. In addition, resin particles can be produced without changing functional group concentration of the thermoplastic resin. Furthermore, even if a content of the thermoplastic resin is increased, a pre-molded article in which resin particles are dispersed can be formed. Still more, when the water-soluble matrix (or the matrix composition) according to an embodiment of the present invention is used, a large amount thereof is entangled with a screw of an extruder, resin particles can be formed even if a discharge rate is increased, and the production efficiency of the resin particles can be improved. In addition, the water-soluble matrix, even if melt-kneaded, can provide a pre-molded article (dispersion) in the form of pellets, which are easy to handle, and can further improve the production efficiency of the resin particles.

BRIEF DESCRIPTION OF DRAWINGS

FIG. 1 is a graph illustrating the results of Example 1.

DESCRIPTION OF EMBODIMENTS

The water-soluble matrix (or matrix composition or matrix component) according to an embodiment of the present invention contains a water-soluble polyvinyl alcohol (PVA)-based resin and a saccharide (a water-soluble saccharide, which may be hereinafter simply referred to as a saccharide), and the PVA-based resin contains a modified polyvinyl alcohol-based resin (having a wide usable temperature range of melt-kneading) that is modified with a predetermined modifying group (the modified polyvinyl alcohol-based resin may be hereinafter simply referred to as the modified PVA-based resin).

Modified PVA-Based Resin

The modified polyvinyl alcohol-based resin is modified with a hydrophilic modifying group and contains in a side chain thereof (a) an alkyl group or alkyl chain (or a unit including this alkyl group (or alkyl chain)) including at least one hydroxyl group (one or more hydroxyl groups).

The alkyl group or alkyl chain in the side chain of the modified PVA-based resin may be a linear or branched $C_{1-12}$ alkyl group (for example, a $C_{2-8}$ alkyl group), such as a methyl group, an ethyl group, a propyl group, a butyl group, a pentyl group, and a hexyl group.

The number of the hydroxyl group is, for example, from 1 to 7 (for example, from 1 to 5), preferably from 2 to 4, more preferably from approximately 2 to 3, and particularly 2 per alkyl group (or alkyl chain) or side chain. That is, the side chain of the modified polyvinyl alcohol-based resin may include an alkyl group including a plurality of hydroxyl groups.

Furthermore, the modified PVA-based resin is often modified with a modifying group (or side chain) including at least a primary hydroxyl group, and the side chain of the modified PVA-based resin often includes, for example, at least a primary hydroxyl group. That is, the modified PVA-based resin often includes in a side chain thereof an alkyl group (or a unit including an alkyl group) (a1) and/or (a2) below.

(a1) an alkyl group (or a unit including an alkyl group) including a primary hydroxyl group;

(a2) an alkyl group (or a unit including an alkyl group) including a primary hydroxyl group and a secondary hydroxyl group.

The number of the primary hydroxyl group is, for example, from 1 to 5 (for example, from 1 to 4), preferably from 1 to 3, and more preferably approximately 1 or 2 (particularly 1) per alkyl group (or alkyl chain) or side chain.

More specifically, the modified PVA-based resin often includes in a side chain thereof (or an alkyl group or an alkyl chain in a side chain thereof) an alkyl group substituted with a hydroxyalkyl group, particularly two hydroxyl groups or two hydroxy $C_{1-4}$ alkyl groups (such as hydroxymethyl groups) at the same carbon atom or adjacent carbon atoms (a dihydroxyalkyl group or a dihydroxyalkyl-alkyl group). The modified PVA-based resin often includes, for example, a unit including a dihydroxyalkyl group, represented by Formula (1) below.

[Chem. 3]

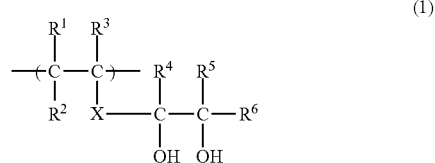

where $R^1$, $R^2$, $R^3$, $R^4$, $R^5$, and $R^6$ are the same or different and represent a hydrogen atom or an organic group; and X represents a single bond or a bonding chain (or a linking group).

The organic group may be exemplified by linear or branched $C_{1-4}$ alkyl groups, such as a methyl group, an ethyl group, an n-propyl group, an isopropyl group, an n-butyl group, an isobutyl group, and a t-butyl group. Preferred alkyl groups are a methyl group or an ethyl group. These alkyl groups may include as necessary a substituent, such as a halogen atom, a hydroxyl group, an alkoxy group, a carboxyl group, an alkoxycarbonyl group, or a sulfonyl group. In Formula (1) above, preferred $R^1$ to $R^6$ are hydrogen atoms.

The bonding chain (linking group) represented by X may be exemplified by hydrocarbon groups (in these hydrocarbon groups, a halogen atom, such as fluorine, chlorine, or bromine, may be substituted), such as alkylene groups ($C_{2-10}$ alkylene groups, such as an ethylene group), alkenylene groups ($C_{2-6}$ alkenylene groups, such as a vinylene group and a propenylene group), alkynylene groups, and arylene groups (such as a phenylene group and naphtylene group); an ether group (—O—); $C_{2-4}$ alkyleneoxy groups [such as —(CH$_2$O)$_m$—, —(OCH$_2$)$_m$—, and —(CH$_2$O)$_m$CH$_2$—]; a carbonyl group (—CO—); a diketo group (—COCO—); alkylenedicarbonyl groups (such as —CO(CH$_2$)$_m$CO—); arenedicarbonyl groups (such as —CO(C$_6$H$_4$)CO—); a thioether group (—S—); a thiocarbonyl group (—CS—); a sulfinyl group (—SO—); a sulfonyl group (—SO$_2$—); an imino group or a substituted imino group (—NR—); urethane groups (—CONR— and —NRCO—); thiourethane groups (—CSNR— and —NRCS—), and —NRCS—); an azo group (—NRNR—); a phosphate ester group (—HPO$_4$—); silicon-containing groups [—Si(OR)$_2$—, —OSi(OR)$_2$—, and —OSi(OR)$_2$O—]; titanium-containing groups [such as —Ti(OR)$_2$— and —OTi(OR)$_2$—]; and aluminum-containing groups [such as —Al(OR)—, —OAl(OR)—, and —OAl(OR)O—]. Here, R is each independently an arbitrary substituent and may be, for example, a hydrogen atom, a $C_{1-12}$ alkyl group, an alkoxy group, and an acyl group; and m each independently represents a natural number.

Of these bonding chains (linking groups) X, $C_{2-6}$ alkylene groups (particularly $C_{1-2}$ alkylene groups, such as a methylene group) and —$CH_2OCH_2$— are preferred. In particular, a preferred X is a single bond.

In particular, the modified PVA-based resin preferably includes in a side chain thereof (or an alkyl group in a side chain thereof) a 1,2-diol structure (or a 1,2-dihydroxyalkyl group), and preferably includes a unit represented by Formula (1-1) below.

[Chem. 4]

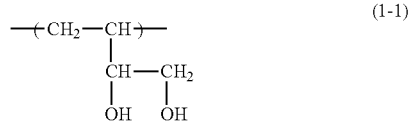

(1-1)

Such a modified PVA-based resin may be any of: a modified PVA-based resin formed by modifying an unmodified PVA-based resin to introduce a side chain including the alkyl group (or a unit containing the alkyl group) (a) (for example, a modified PVA-based resin modified by esterification, etherification, acetalization, urethanization, phosphate esterification, or the like with a hydroxycarboxylic acid, such as glycolic acid, lactic acid, and glycerol acid); and a copolymerization-modified PVA-based resin. Preferred modified PVA-based resins can be prepared by at least saponification of a copolymerization-modified PVA-based resin, for example, a copolymer of a vinyl ester-based monomer and a copolymerizable monomer that is copolymerizable with a vinyl ester-based monomer, where the copolymerizable monomer only needs to contain a copolymerizable monomer (a first copolymerizable monomer) into which a side chain including at least the alkyl group (or a unit containing the alkyl group) (a) can be introduced and may further contain an additional copolymerizable monomer (a second copolymerizable monomer).

The vinyl ester-based monomer may be exemplified by vinyl $C_{1-20}$ alkanoates or vinyl $C_{2-20}$ alkenoates, such as vinyl formate, vinyl acetate, vinyl propionate, vinyl valerate, vinyl butyrate, vinyl isobutyrate, vinyl pivalate, vinyl caprylate, vinyl laurate, vinyl stearate, and vinyl versatate; and vinyl arene carbonates, such as vinyl benzoate. In addition, if necessary, a substituted vinyl acetate, such as 1-methoxyvinyl acetate and isopropenyl acetate, can also be used. These vinyl ester-based monomers can be used alone or in combination of two or more types. Of these vinyl ester-based monomers, a vinyl $C_{1-3}$ alkanoate, particularly vinyl acetate is often used in terms of economy and the like.

The first copolymerizable monomer may be exemplified by hydroxy group-containing $C_{3-10}$ α-olefins or derivatives thereof (for example, acylated compounds, such as acetylated compounds), such as 3-buten-1-ol, 4-penten-1-ol, and 5-hexen-1-ol; and monomers represented by Formulas (1a) to (1c) below.

[Chem. 5]

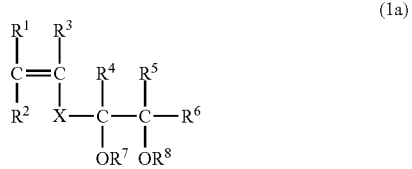

(1a)

-continued

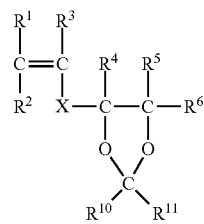

(1b)

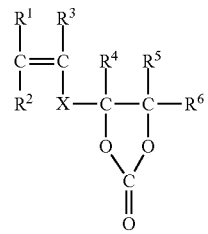

(1c)

where $R^7$ and $R^8$ each independently represent a hydrogen atom or an acyl group $R^9$—CO— ($R^9$ represents a hydrogen atom or a $C_{1-4}$ alkyl group); $R^{10}$ and $R^{11}$ each independently represent a hydrogen atom or a $C_{1-4}$ alkyl group; and $R^1$ to $R^6$ and X are the same as described above.

The acyl group may be exemplified by a formyl group; and $C_{1-4}$ alkyl-carbonyl groups, such as an acetyl group and a propionyl group. The acyl group is often a $C_{1-2}$ alkyl-carbonyl group, particularly an acetyl group. The alkyl group is often an $C_{1-4}$ alkyl group, such as a methyl group and an ethyl group (particularly, a methyl group or an ethyl group). $R^7$ and $R^8$ are typically a hydrogen atom or an acetyl group, and $R^{10}$ and $R^{11}$ are often typically a hydrogen atom or a $C_{1-2}$ alkyl group.

Representative compounds represented by Formula (1a) may be exemplified by diacyl $C_{4-10}$ alkenes, for example, such as 1,4-diacyloxy-2-butenes (for example, such as 1,4-diacetyloxy-2-butene), 3,4-diacyloxy-1-butenes (for example, such as 3,4-diacetyloxy-1-butene); representative compounds represented by Formula (1b) may be exemplified by 2,2-dialkyl-4-vinyl-1,3-dioxolanes (for example, 2,2-dimethyl-4-vinyl-1,3-dioxolane); and representative compounds represented by Formula (1c) may be exemplified by vinyl $C_{2-6}$ alkylene carbonates (for example, vinyl ethylene carbonate).

These first copolymerizable monomers can be used alone or in combination of two or more types. Of these first copolymerizable monomers, a compound represented by Formula (1a) (for example, 3,4-diacetyloxy-1-butene) is often used in terms of copolymerization reactivity and industrial handleability.

For example, copolymerization of vinyl acetate as a vinyl ester monomer and 3,4-diacetyloxy-1-butene is highly copolymerizable with reactivity ratios (r) of each monomer being r=0.710 for vinyl acetate while r=0.701 for 3,4-diacetyloxy-1-butene. On the other hand, in copolymerization of vinyl acetate and vinyl ethylene carbonate as a compound represented by Formula (1c), reactivity ratios (r) are r=0.85 for vinyl acetate while r=5.4 for vinyl ethylene carbonate.

In addition, 3,4-diacetyloxy-1-butene is highly polymerizable with a chain transfer constant (Cx) of 0.003 (65° C.) relative to vinyl ethylene carbonate with Cx=0.005 (65° C.) and 2,2-dimethyl-4-vinyl-1,3-dioxolane as a compound represented by Formula (1b) with Cx=0.023 (65° C.).

Furthermore, 3,4-diacetyloxy-1-butenes (for example, such as 3,4-diacetyloxy-1-butene) have a great industrial advantage as a byproduct formed by saponification thereof is an alkanoic acid (for example, acetic acid), similarly to a byproduct compound formed by saponification of a vinyl ester-based monomer, and thus a treatment and recovery of a solvent after saponification of the copolymer is possible without providing a special apparatus or process. Here, if decarboxylation or deketalization of a copolymer obtained by copolymerizing monomers represented by Formulas (1b) and (1c) is insufficient, the modified PVA-based resin may be crosslinked with the remaining carbonate ring or acetal ring to form a gel-like substance.

Compounds represented by Formulas (1a) to (1c) are well known and may be prepared by a well-known method or may be commercially available. For example, the monomer represented by Formula (1a) can be prepared by methods described in WO 2000/24702, U.S. Pat. Nos. 5,623,086, 6,072,079, etc., or methods similar thereto. For example, 3,4-diacetyloxy-1-butene can be produced by a synthesis method via an epoxybutene derivative or by a reaction to isomerize 1,4-diacetyloxy-1-butene, which is an intermediate product of a 1,4-butanediol production process, using a metal catalyst, such as palladium chloride. In addition, the monomer represented by Formula (1a) can be obtained from Across Co., Ltd., etc.

A ratio (molar ratio) of the vinyl ester-based monomer and the first copolymerizable monomer is, for example, the former/the latter=approximately from 50/50 to 99.5/0.5 (for example, from 70/30 to 99/1), preferably from 80/20 to 98.5/1.5 (for example, from 85/15 to 98/2), and more preferably from 90/10 to 97/3 (for example, from 92/8 to 97.5/2.5) according to a degree of modification of the PVA-based resin.

The second copolymerizable monomer may be exemplified by various vinyl compounds, for example, linear or branched $C_{2-12}$ olefins, such as ethylene, propylene, isobutylene, α-octene, α-dodecene, and α-octadecene; unsaturated carboxylic acids or derivatives thereof (for example, salts, mono- or dialkylesters thereof), such as (meth)acrylic acid, crotonic acid, maleic acid, maleic anhydride, fumaric acid, itaconic acid, and undecylenic acid; nitriles, such as (meth) acrylonitrile; amides, such as diacetone acrylamide and (meth)acrylamide; olefin sulfonic acids or salts thereof, such as ethylene sulfonic acid and (meth)allylsulfonic acid; alkyl vinyl ethers; vinyl ketones (such as dimethyl allyl vinyl ketone and N-vinylpyrrolidone); halogen-containing vinyl compounds (such as vinyl chloride and vinylidene chloride); allyl ethers (such as glycerin monoallyl ether); and vinyl carbonates (such as vinylene carbonate). These copolymerizable monomers can be used alone or in combination of two or more types.

The second copolymerizable monomer may be used in an amount of, for example, approximately from 0 to 30 mol % (for example, from 1 to 25 mol %), preferably from 0 to 20 mol % (for example, from 3 to 15 mol %), and more preferably from 0 to 10 mol % (for example, from 5 to 10 mol %), based on the entire amount of monomers.

The modified PVA-based resin can be prepared, for example, by at least saponification of a copolymer of a vinyl ester-based monomer and a copolymerizable monomer containing at least a monomer corresponding to Formula (1) above (for example, the monomer represented by Formulas (1a) to (1c) above) as a copolymerizable monomer. More specifically, the modified PVA-based resin can be prepared by methods, for example, such as: (i) saponifying a copolymer of a vinyl ester-based monomer and a copolymerizable monomer containing at least the monomer represented by Formula (1a) above as a copolymerizable monomer; (ii) saponifying a copolymer of a vinyl ester-based monomer and a copolymerizable monomer containing at least the monomer represented by Formula (1b) above as a copolymerizable monomer, followed by deketalization; and (iii) saponifying a copolymer of a vinyl ester-based monomer and a copolymerizable monomer containing at least the monomer represented by Formula (1c) above as a copolymerizable monomer, followed by decarboxylation. For these methods, reference can be made to, for example, JP 2006-95825 A.

An amount of modification of the modified PVA-based resin (ratio of a unit represented by Formula (1) above relative to all units of the modified PVA-based resin) varies depending on the nature of the modifying group but may typically be, for example, approximately from 1 to 30 mol % (for example, from 1 to 20 mol %), preferably from 1.2 to 12 mol % (for example, from 1.5 to 10 mol %), more preferably from 2 to 10 mol % (for example, from 3 to 8 mol %). If the introduced amount of the modifying group is too small, the melting point increases, thus the molding temperature needs to be increased, which tends to generate insoluble matter due to thermal degradation, and water solubility tends to decrease. On the other hand, if the introduced amount of the modifying group is too large, the melt moldability tends to decrease. The content of the unit represented by Formula (1) can be determined from a $^1$H-NMR spectrum (solvent: DMSO-$d_6$, internal standard: tetramethylsilane) of a completely saponified modified PVA-based resin. Specifically, the content can be calculated from peak areas derived from a proton of a hydroxyl group, a methine proton, and a methylene proton, a methylene proton of the main chain, a proton of a hydroxyl group bonded to the main chain, and the like in the structural unit represented by Formula (1).

An average degree of polymerization (measured in accordance with JIS K 6726) of the modified PVA-based resin may be, for example, approximately from 100 to 3000 (for example, from 150 to 2000), preferably from 170 to 1000 (for example, from 200 to 800), and more preferably from 230 to 600 (for example, from 250 to 600). If the average degree of polymerization is too low, the production efficiency of the modified PVA-based resin would likely decrease, and if the average degree of polymerization is too high, the melt viscosity of the modified PVA-based resin would increase, and the melt moldability would likely decrease.

In addition, a viscosity of a 4 wt. % aqueous solution (20° C., Höppler viscometer) of the modified PVA-based resin may be, for example, approximately from 1 to 100 mPa·s (for example, from 1.5 to 75 mPa·s), preferably from 2 to 70 mPa·s (for example, from 2.3 to 60 mPa·s), and more preferably from 3 to 50 mPa·s (for example, from 5 to 30 mPa·s), or may be approximately from 1.5 to 10 mPa·s (for example, from 2 to 8 mPa·s), and preferably from 2.3 to 5 mPa·s (for example, from 2.5 to 4 mPa·s).

When measured in accordance with JIS K 6726, a degree of saponification of the modified PVA-based resin may be for example approximately from 50 to 100 mol %, preferably from 60 to 100 mol % (for example, from 70 to 100 mol %), and more preferably from 80 to 100 mol % (for example, from 90 to 100 mol %), or may be approximately from 95 to 100 mol % (for example, from 98 to 100 mol %). If the degree of saponification is too low, water solubility and thermal stability in the melt molding process may decrease, and an acetic acid odor may occur.

A melt viscosity of the modified PVA-based resin at a temperature of 260° C. and a shearing speed of 122 sec$^{-1}$ may be, for example, approximately from 2 to 100 Pa·s (for example, from 5 to 80 Pa·s), preferably from 7 to 75 Pa·s (for example, from 10 to 70 Pa·s), and more preferably from 12 to 65 Pa·s (for example, from 15 to 50 Pa·s), or may be approximately from 20 to 60 Pa·s (for example, from 30 to 50 Pa·s). The melt viscosity can be measured using a flow profile measuring device ("Capilograph 1D" available from Toyo Seiki Seisaku-sho, Ltd.) for a molten polymer with a barrel diameter of 9.55 mm and a total barrel length of 350 mm (effective length of 250 mm).

A melt flow rate (MFR) of the modified PVA-based resin at a temperature of 210° C. under a load of 2160 g may be, for example, approximately from 1 to 160 g/10 min (for example, from 10 to 155 g/10 min), preferably from 15 to 150 g/10 min (for example, from 20 to 140 g/10 min), and more preferably from 25 to 120 g/10 min (for example, from 30 to 100 g/10 min), or may be approximately from 10 to 100 g/10 min (for example, from 15 to 80 g/10 min), and preferably from 20 to 70 g/10 min (for example, from 25 to 50 g/10 min). If the MFR is too low, flow moldability and the productivity would likely decrease, and if the MFR is too high, the moldability tends to decrease.

The modified PVA-based resin has high heat resistance as well as a wide molding temperature range (molding processing temperature range) in comparison with an unmodified PVA-based resin. A melting point of the modified PVA-based resin when the temperature is increased at a rate of 10° C./min under a nitrogen stream by differential scanning calorimetry (DSC) may be, for example, approximately from 120 to 225° C. (for example, from 130 to 220° C.), preferably from 140 to 215° C. (for example, from 145 to 210° C.), and more preferably from 150 to 205° C. (for example, from 160 to 200° C.), or may be approximately from 150 to 225° C. (for example, from 160 to 222° C.), preferably from 165 to 220° C. (for example, from 170 to 220° C.), and more preferably from 175 to 215° C. On the other hand, with regard to a thermal decomposition starting temperature, when the temperature is increased at a rate of 10° C./min under a nitrogen stream by differential scanning calorimeter (DSC), a temperature at which the weight of the modified PVA-based resin decreases by 1 wt. % is 255° C. or higher (for example, approximately from 256 to 260° C.), and a temperature at which the weight of the modified PVA-based resin decreases by 2 wt. % is 275° C. or higher (for example, approximately from 276 to 280° C.). Furthermore, when the temperature is increased from 30° C. to 600° C. at a temperature increase rate of 10° C./min in thermogravimetric analysis (TGA), a thermal decomposition temperature of the modified PVA resin is from 330 to 420° C. (for example, from 350 to 410° C., preferably from 370 to 405° C., and more preferably from 380 to 400° C.) in a nitrogen atmosphere, and approximately from 320 to 410° C. (for example, from 340 to 400° C., preferably from 360 to 395° C., and more preferably from 370 to 390° C.) in an air atmosphere. Thus, the modified PVA-based resin has a wide melt molding processing temperature range and excellent moldability. For example, the molding processing temperature (or melt-kneading temperature) may be approximately from 170 to 230° C., preferably from 175 to 225° C., and more preferably from 180 to 210° C. (for example, from 185 to 210° C.).

In addition, a melting point of a completely saponified unmodified PVA resin is, for example, approximately 227° C., a temperature at which the weight decreases by 1 wt. % is, for example, approximately 257.4° C., and a temperature at which the weight decreases by 2 wt. % is, for example, approximately 277.3° C. Furthermore, when the temperature is increased from 30° C. to 600° C. at a temperature increase rate of 10° C./min in thermogravimetric analysis (TGA), a thermal decomposition temperature of a completely saponified unmodified PVA resin is 292° C. in a nitrogen atmosphere and 303° C. in an air atmosphere. Thus, an unmodified PVA resin has a narrow melt molding processing temperature range.

A water contact angle of the modified PVA-based resin, which is a film having a thickness of 60 μm (produced by feeding a 5 wt. % aqueous solution into a 10 cm×10 cm mold and drying it in an environment at 23° C. and 50% RH for 2 days), may be approximately from 20 to 80°, preferably from 25 to 80°, more preferably from 30 to 75°, and particularly from 30 to 70°. If the water contact angle is too small, uniformity of particle size and particle shape of hydrophilic resin particles may be impaired, and if the water contact angle is too large, uniformity of particle size and particle shape of hydrophobic resin particles may be impaired. Here, the water contact angle can be determined by dripping 0.2 mL of purified water onto the surface of the film in an environment at 23° C. and 50% RH, and measuring the angle between the water droplet and the film surface. Such a measurement is performed 10 times, and the average value can be determined as the contact angle. For example, a "solid-liquid interface analyzer" available from Kyowa Interface Science Co., Ltd. can be used to measure the contact angle.

The water-soluble matrix may include as necessary an additional water-soluble resin, for example, such as a polyethylene glycol-based resin (such as polyethylene glycol and a polyethylene glycol-polypropylene glycol block copolymer), an unmodified polyvinyl alcohol-based resin, a polyvinylpyrrolidone-based resin, a cellulose ether (such as a hydroxypropyl cellulose, a carboxymethylcellulose, or a salt thereof), or a polysaccharide (such as alginic acid or a salt thereof).

Saccharide

The water-soluble matrix includes a water-soluble saccharide (or a hot-melt saccharide) in addition to the water-soluble modified PVA-based resin. The saccharide may be a monosaccharide, a sugar alcohol, or the like. The monosaccharide may be exemplified by arabinose, ribose, xylose, glucose, mannose, galactose, and fructose. These monosaccharides can be used alone or in combination of two or more types.

Examples of the sugar alcohol may include erythritol, pentaerythritol, xylitol, sorbitol, and mannitol. These sugar alcohols can also be used alone or in combination of two or more types. The sugar alcohol often includes at least one type selected from erythritol, pentaerythritol, xylitol, and sorbitol.

Furthermore, the saccharide may include a water-soluble oligosaccharide (for example, an oligosaccharide, such as a disaccharide, such as trehalose and sucrose; a trisaccharide, such as maltotriose; and a tetrasaccharide, such as maltotetraose). The oligosaccharide may include at least a tetrasaccharide, and the oligosaccharide may be exemplified by a starch sugar (such as a starch saccharification product and a reduced starch saccharification product), a galactooligosaccharide, a coupling sugar, a fructooligosaccharide, a xylooligosaccharide, a soybean oligosaccharide, a chitin oligosaccharide, and a chitosan oligosaccharide. These oligosaccharides can also be used alone or in combination of two or more types.

The saccharide often includes at least a sugar alcohol (such as sorbitol).

Probably because the water-soluble modified PVA-based resin and the saccharide form a miscible system, the melt-kneading temperature of the water-soluble matrix can be adjusted in a wide range by mixing them at any ratio according to the melting point or glass transition temperature of the resin. Thus, a weight ratio of the water-soluble modified PVA-based resin and the saccharide can be selected from a wide range of the former/the latter=approximately from 99.5/0.5 to 60/40 and may typically be approximately from 99/1 to 50/50 (for example, from 98/2 to 60/40), preferably from 97/3 to 70/30 (for example, from 95/5 to 75/25), and more preferably from 90/10 to 80/20, or may be approximately from 97.5/2.5 to 85/15 (for example, from 97/3 to 90/10).

The water-soluble modified PVA-based resin containing a small amount of saccharide, in comparison with the water-soluble modified PVA-based resin alone, has greatly improved water solubility and can greatly improve the elution property of the water-soluble matrix in water, and moreover the water-soluble matrix can efficiently disperse the resin particles by kneading. In addition, in conjunction with the wide molding processing temperature range of the water-soluble modified PVA-based resin, the melt moldability is also greatly improved, and the melt-kneading temperature can be adjusted by the ratio of the water-soluble modified PVA-based resin and the saccharide according to the type of resin (melting point or glass transition temperature). Thus, even if a thermoplastic resin has a high melting point or glass transition temperature, resin particles can be uniformly dispersed by melt-kneading. In particular, the thermoplastic resin can be dispersed in the form of spherical particles by melt-kneading with a thermoplastic resin.

Pre-molded Article and Method for Producing Resin Particles

In an embodiment of the present invention, resin particles can be produced by bringing a pre-molded article (or a dispersion) in which resin particles are dispersed in the water-soluble matrix (or the matrix component) into contact with an aqueous solvent to elute or remove the water-soluble matrix. More specifically, the resin particles can be obtained through a forced emulsification method, for example, melt-kneading the water-soluble matrix (or matrix component) and a resin (meltable resin); removing the water-soluble matrix by elution with an aqueous solvent from a pre-molded article (melt-kneaded product), in which resin particles formed by the kneading are dispersed in the water-soluble matrix, to form resin particles; collecting the formed resin particles; and controlling moisture by drying or humidifying collected resin particles through controlling temperature and humidity as necessary.

In the pre-molded article (or the dispersion), the resin particles may be formed of a non-water-soluble resin or a water-insoluble resin of various types that are inmiscible with the matrix, for example, a thermosetting resin (such as a phenolic resin and an epoxy resin), but typically, the resin particles are often formed of a thermoplastic resin (particularly a melt-kneadable resin).

The thermoplastic resin may be exemplified by olefin-based resins, acrylate-based resins, styrene-based resins, halogen-containing resins, vinyl ester-based resins or water-insoluble derivatives thereof, polyester-based resins, poly amide-based resins, polycarbonate-based resins, polyurethane-based resins, poly(thio)ether-based resins (for example, polysulfide-based resins, such as polyphenylene ether-based resins and polyphenylene sulfide-based resins), polysulfone-based resins (for example, polysulfone resins and polyethersulfone-based resins), polyether ketone-based resins (such as polyphenylene ether ether ketone-based resins), polyimide-based resins (for example, such as polyetherimide-based resins, polyamide-imide-based resins, and polybenzimidazole-based resins), polyacetal-based resins, and cellulose ester-based resins (such as cellulose acetates), thermoplastic elastomers (for example, poly amide-based elastomers (such as polyamide-polyether block copolymers), polyester-based elastomers, polyurethane-based elastomers, polystyrene-based elastomers, polyolefin-based elastomers, and fluorine-based thermoplastic elastomers). These resins can be used alone or in combination of two or more types.

The olefin-based resin may be exemplified by a homopolymer or copolymer of an $\alpha$-$C_{2-6}$ olefin, such as a polyethylene, a polypropylene, an ethylene-propylene copolymer; and a copolymer of an olefin and a copolymerizable monomer (such as an ethylene-(meth)acrylate copolymer and an ethylene-(meth)acrylate copolymer; and a homopolymer or copolymer of a cyclic olefin, such as dicyclopentadiene (such as an ethylene-norbornene copolymer).

The acrylate-based resin may be exemplified by a poly (meth)acrylate, such as methyl poly(meth)acrylate; a homopolymer or copolymer of a (meth)acrylate-based monomer, such as a methyl methacrylate-(meth)acrylate copolymer, a methyl methacrylate-acrylate-(meth)acrylic acid copolymer, a methyl methacrylate-(meth)acrylate copolymer, and a (meth)acrylate-styrene copolymer (such as an MS resin).

Examples of the styrene-based resin include a homopolymer or copolymer of a styrene-based monomer, such as polystyrene, a styrene-vinyltoluene copolymer, and a styrene-$\alpha$-methylstyrene copolymer; a copolymer of a styrene-based monomer and a copolymerizable monomer, such as a styrene-acrylonitrile copolymer (an AS resin), a (meth)acrylate-styrene copolymer (such as an MS resin), and a styrene-maleic anhydride copolymer; a block copolymer and the like, such as a styrene-butadiene block copolymer; and a graft polymer that is graft-polymerized with at least a styrene-based monomer in the presence of a rubber component, for example, a rubber-containing styrene-based copolymer, such as a high-impact polystyrene (HIPS), an acrylonitrile-butadiene-styrene copolymer (ABS resins), and a methyl methacrylate-butadiene rubber-styrene copolymer (an MBS resin).

The halogen-containing resin may be exemplified by polyvinyl chloride-based resins, vinyl chloride-vinyl acetate copolymers, vinylidene chloride-based resins, and fluororesins (melt-flowable fluororesins). The vinyl ester-based resin or the water-insoluble derivative thereof may be exemplified by a homopolymer or copolymer of a vinyl carboxylate ester (such as a polyvinyl acetate and an ethylene-vinyl acetate copolymer), a derivative from a saponified product thereof (for example, a polyvinyl acetal-based resin, such as a polyvinyl formal and a polyvinyl butyral).

Examples of the polyester-based resin include poly $C_{2-6}$ alkylene-arylate-based resins, such as a polyethylene terephthalate, a poly(trimethylene terephthalate), a polypropylene terephthalate, a polybutylene terephthalate, a polyethylene naphthalate, and a polybutylene naphthalate; polycyclo $C_{6-10}$ alkylene-arylate-based resins, such as poly (1,4-cyclohexyldimethylene terephthalate); copolyesters containing a $C_{2-6}$ alkylene-arylate unit or a cyclo $C_{6-10}$ alkylene-arylate unit as a main component (for example, 50 wt. % or greater) (for example, the copolymer component is a copolyester, such as an aliphatic dicarboxylic acid, isophthalic acid, and phthalic acid); aromatic polyester-based resins, such as polyarylate-based resins and liquid crystal polyesters; a poly($C_{2-6}$ alkylene glycol-$C_{2-10}$ aliphatic dicarboxylate), such as a poly $C_{2-6}$ alkylene-succinate and a poly $C_{2-6}$ alkylene-adipate; polyoxycarboxylic acid-based resins (for example, such as polyglycolic acids, polylactic acids, and glycolic acid-lactic acid copolymers); lactone-based resins and the like, such as polycaprolactones), and copolyesters thereof (for example, such as polycaprolactone-polybutylene succinate copolymer resins). The polyester-based resin may contain a urethane bond. Furthermore, the polyester-based resin may have biodegradability.

Examples of the polyamide-based resin include aliphatic polyamides, alicyclic polyamides, and aromatic polyamides. The polyamide-based resin may be a homopolyamide (a polyamide-based homopolymer resin) or a copolyamide (a polyamide-based copolymer resin) of a polyamide-forming component.

Of the aliphatic polyamide-based resins, the homopolyamides include: a homopolyamide or copolyamide of an aliphatic diamine component [such as an alkanediamine (for example, a $C_{4-16}$ alkylenediamine, such as tetramethylenediamine, hexamethylenediamine, trimethylhexamethylenediamine and dodecanediamine; preferably a $C_{6-14}$ alkylenediamine and more preferably a $C_{6-12}$ alkylenediamine)] and an aliphatic dicarboxylic acid component [for example, such as an alkanedicarboxylic acid (for example, a $C_{4-20}$ alkanedicarboxylic acid, such as adipic acid, sebacic acid, and dodecane diacid; preferably a $C_{5-18}$ alkanedicarboxylic acid and more preferably a $C_{6-16}$ alkanedicarboxylic acid)]; a homopolyamide or copolyamide of a lactam [such as a lactam having approximately from 4 to 20 carbons (preferably from 6 to 16 carbons and more preferably from 8 to 14 carbons), such as ε-caprolactam and ω-laurolactam] or an aminocarboxylic acid (for example, a $C_{4-20}$ aminocarboxylic acid, such as ω-aminoundecanoic acid and ω-aminododecanoic acid; preferably a $C_{6-16}$ aminocarboxylic acid and more preferably a $C_{8-14}$ aminocarboxylic acid); a copolyamide of a first amide-forming component including an aliphatic diamine component and an aliphatic dicarboxylic acid component in combination and a second amide-forming component including an lactam and/or an aminocarboxylic acid; and the like. The dicarboxylic acid component of the polyamide-based resin may contain a dimer acid unit. Furthermore, the polyamide-based resin may have biodegradability. The aliphatic polyamide-based resin may contain a unit derived from at least one type of component selected from laurolactam, aminoundecanoic acid, and aminododecanoic acid.

Specific examples of the aliphatic polyamide-based resin include polyamide 6, polyamide 11, polyamide 12, polyamide 46, polyamide 66, polyamide 610, polyamide 611, polyamide 612, polyamide 613, polyamide 1010, polyamide 1012, polyamide 1212, polyamide 66/11, polyamide 6/12, polyamide 66/12, polyamide 610/12, and polyamide 6/12/612.

Examples of the alicyclic polyamide-based resin include a homopolyamide or copolyamide formed by polymerizing at least one type selected from alicyclic diamine components and alicyclic dicarboxylic acid components as a monomer, and, for example, alicyclic polyamides obtained by using, of the diamine components and the dicarboxylic acid components, an alicyclic diamine and/or an alicyclic dicarboxylic acid as at least a part of the component can be used. In particular, as the diamine component and the dicarboxylic acid component, the aliphatic diamine component and/or the aliphatic dicarboxylic acid component exemplified above are preferably used in combination with the alicyclic diamine component and/or the alicyclic dicarboxylic acid component. Such alicyclic polyamides are highly transparent and are known as so-called transparent polyamides.

Examples of the alicyclic diamine components include diaminocycloalkanes (such as diamino $C_{5-10}$ cycloalkanes), such as diaminocyclohexane; bis(aminocycloalkyl)alkanes [such as bis(amino $C_{5-8}$ cycloalkyl)$C_{1-3}$ alkanes], such as bis(4-aminocyclohexyl)methane, bis(4-amino-3-methylcyclohexyl)methane, and 2,2-bis(4'-aminocyclohexyl)propane; and a hydrogenated xylylenediamine. The alicyclic diamine components may include a substituent, such as an alkyl group (a $C_{1-6}$ alkyl group, such as a methyl group and an ethyl group; preferably a $C_{1-4}$ alkyl group and more preferably a $C_{1-2}$ alkyl group. In addition, examples of the alicyclic dicarboxylic acids include cycloalkane dicarboxylic acids (such as $C_{5-10}$ cycloalkane-dicarboxylic acids), such as 1,4-cyclohexanedicarboxylic acid and 1,3-cyclohexanedicarboxylic acid.

Examples of representative alicyclic polyamide-based resins include condensates of an alicyclic diamine component [for example, such as bis(aminocyclohexyl)alkanes] and an aliphatic dicarboxylic acid component [for example, such as an alkanedicarboxylic acid (for example, such as a $C_{4-20}$ alkane-dicarboxylic acid component)].

The aromatic polyamide-based resin include polyamides in which at least one component of the aliphatic diamine component or the aliphatic dicarboxylic acid component in the aliphatic polyamide is an aromatic component, for example, such as polyamides in which the diamine component is an aromatic diamine component [for example, a condensate (for example, such as MXD-6) of an aromatic diamine (such as metaxylylene diamine) and an aliphatic dicarboxylic acid] and polyamides in which the dicarboxylic acid component is an aromatic component [for example, a condensate of an aliphatic diamine (such as trimethylhexamethylenediamine) and an aromatic dicarboxylic acid (such as terephthalic acid and isophthalic acid)]. In addition, the aromatic polyamide-based resin may be a wholly aromatic polyamide (aramid) [such as poly(m-phenylene isophthalamide)], a polyamide in which the diamine component and the dicarboxylic acid component are aromatic components.

These polyamide-based resins may be used alone or in combination of two or more types. In addition, the polyamide-based resin may be an aromatic polyamide-based resin in which one component of the aliphatic diamine component and the aliphatic dicarboxylic acid component is an aromatic component, but typically, the polyamide-based resin is often an aliphatic polyamide and/or an alicyclic polyamide. Also, polyamide-based resin (such as a copolyamide) often includes a long-chain alkylene group, for example, such as a $C_{8-16}$ alkylene group and preferably a $C_{10-14}$ alkylene group, deriving from a dicarboxylic acid, a lactam, and/or an aminocarboxylic acid (for example, at least one type of component selected from lactams and aminoalkanecarboxylic acids). Furthermore, the polyamide-based resin may be a copolyamide (polyamide-based copolymer resin) whose properties can be adjusted according to the application.

Examples of the polycarbonate-based resin include aromatic polycarbonates based on bisphenols, such as bisphenol A type polycarbonate resins; and aliphatic polycarbonates, such as diethylene glycol bisallyl carbonates.

The polyurethane-based resin can be exemplified by polyurethane-based resins obtained by a reaction of an aliphatic, alicyclic, or aromatic diisocyanate; a polyol (for example, such as a polyester polyol; a polyether polyol, such as a polytetramethylene ether glycol; and a polycarbonate polyol); and a chain extender as necessary.

Of these thermoplastic resins, for example, an olefin-based resin, an acrylate-based resin, a styrene-based resin, a polyester-based resin, a polyamide-based resin, or the like is often used, and a biodegradable resin, for example, a biodegradable polyester-based resin, such as a polyester-based resin (for example, such as a polylactic acid-based resin, a polylactone-based resin, and a polyesteramide) is often used.

The thermoplastic resin may be a non-polar or inert resin that does not include a functional group, or may be a resin including a functional group. For example, a thermoplastic resin, such as an olefin-based resin or a styrene-based resin, does not necessarily have to include a functional group. In an embodiment of the present invention, even if the thermoplastic resin includes a functional group (for example, such as a hydroxyl group, a carboxyl group, an alkoxycarbonyl group, and an amino group), the resin particles can be formed while maintaining the concentration of the functional group. Thus, concentrations of these functional groups are not particularly limited, and in the resin including a plurality of different functional groups, the ratio of concentrations of the different functional groups is not particularly limited either. Such a thermoplastic resin including a functional group may be, for example, a thermoplastic resin including a hydroxyl group, a carboxyl group, and/or an alkoxycarbonyl group [for example, such as a modified olefin-based resin, an acrylate-based resin, a styrene-based resin into which a functional group is introduced), a thermoplastic resin including a carboxyl group and/or a hydroxyl group (representatively, such as a polyester-based resin and a polycarbonate-based resin), a thermoplastic resin including an amino group and/or a carboxyl group (representatively a polyamide-based resin)]. In particular, unlike with polyethylene glycol, a concentration of the amino group of the resin is not reduced and a carboxyl group concentration of the resin is not increased when melt-kneaded with the water-soluble matrix. Thus, the present invention is useful for producing resin particles including at least an amino group as a functional group.

More specifically, even if the water-soluble matrix and the polyamide-based resin including an amino group and a carboxyl group are melt-kneaded to form polyamide resin particles, fluctuations in concentrations of these functional groups can be prevented and the amino group concentration can be maintained in the polyamide resin particles. Thus, a ratio (molar ratio) of the amino group (terminal amino group) and the carboxyl group (terminal carboxyl group) in the polyamide-based resin is the former/the latter=approximately from 1/99 to 99/1 (for example, from 2/98 to 98/2), preferably from 5/95 to 95/5 (for example, from 10/90 to 90/10), more preferably from 20/80 to 80/20 (for example, from 30/70 to 70/30), or may be approximately from 25/75 to 60/40 (for example, from 40/60 to 60/40). In this connection, polyamide resin particles having a high amino group concentration (terminal amino group concentration) relative to the carboxyl group (terminal carboxyl group concentration) can be used for various applications (for example, such as a fiber-reinforced composite material) using high activity of the amino group. Thus, the amino group concentration (terminal amino group concentration, in mmol/kg) in the polyamide-based resin can be selected from a wide range, for example, approximately from 1 to 160 (for example, from 2 to 155 and particularly from 5 to 150), may typically be approximately from 10 to 150 (for example, from 15 to 120), preferably from 20 to 100 (for example, from 25 to 80), more preferably from 30 to 60 (for example, from 35 to 55), or may be approximately from 1 to 150 (for example, from 1 to 100), preferably from 2 to 75 (for example, from 5 to 70), and more preferably from 10 to 60 (for example, from 15 to 50). In addition, the ratio (molar ratio) of the amino group (terminal amino group) to the carboxyl group (terminal carboxyl group) may be the former/the latter=approximately from 20/80 to 95/5 (for example, from 25/75 to 80/20) and preferably from 30/70 to 70/30 (for example, from 35/65 to 60/40) or may be approximately from 30/70 to 50/50 (for example, from 35/65 to 45/55).

Concentrations (contents) of these functional groups can be measured using a commonly used method, for example, such as a titration method, a spectroscopic analysis method, or an NMR method according to the type of resin, and concentrations of functional groups of the polyester-based resin or the polyamide-based resin may be measured by a titration method.

A number average molecular weight of the thermoplastic resin (such as the polyamide-based resin) can be selected from a range approximately from 3000 to 500000 according to the type of resin and may be, for example, approximately from 5000 to 200000, preferably from 7500 to 150000, and more preferably from 10000 to 100000. The number average molecular weight can be measured by a common method, for example, such as gel permeation chromatography using a polystyrene as a standard material, according to the type of resin. Viscosity average molecular weight can be adopted for thermoplastic resins, such as cellulose derivatives (such as cellulose ester-based resins), whose molecular weight is difficult to be measured by gel permeation chromatography.

The thermoplastic resin may be amorphous or crystalline. Olefin-based resins, polyester-based resins, polyamide-based resins (such as copolyamides), and the like are often crystalline. A crystallinity of the crystalline thermoplastic resin is often 90% or less (for example, approximately from 1 to 70% and preferably from 5 to 50%), and, for example, a crystallinity of a semicrystalline or crystalline polyamide-based resin may be 40% or less, for example, approximately from 1 to 30% (for example, from 2 to 25%), preferably from 3 to 20% (for example, from 4 to 17%), and more preferably from 5 to 20% (for example, from 5 to 15%). In addition, a melting point of the crystalline thermoplastic resin can be selected, for example, from a range approximately from 50 to 350° C. (for example, from 70 to 300° C.), and may be approximately from 80 to 280° C. (for example, from 90 to 250° C.) and preferably from 100 to 240° C. (for example, from 120 to 230° C.). For example, a melting point of a semicrystalline or crystalline polyamide-based resin (such as an aliphatic polyamide and an alicyclic polyamide) can be selected from a range approximately from 80 to 350° C. (for example, from 100 to 320° C.), and may typically be approximately from 120 to 300° C. (for example, from 150 to 280° C.) and preferably from 160 to 270° C. (for example, from 170 to 260° C.). If the crystallinity or the melting point is too high, the melt-kneadability and the uniform dispersibility may decrease, which could limit the application of the resin particles. The crystallinity and the melting point can be measured by a commonly used method, for example, an X-ray method and a differential scanning calorimetry (DSC) method.

A glass transition temperature of the thermoplastic resin can be selected from a range of 25° C. or higher (for example, approximately from 25 to 280° C.) according to the type of resin and may typically be approximately from 30 to 270° C. (for example, from 50 to 250° C.), preferably from 70 to 230° C. (for example, from 100 to 220° C.), and more preferably from 120 to 210° C. A glass transition temperature of the polyamide-based resin can be selected, for example, from a range approximately from 30 to 250° C. (for example, from 35 to 230° C.), and may be approximately from 40 to 200° C. (for example, from 45 to 190° C.), preferably from 50 to 180° C. (for example, from 60 to 170° C.), and more preferably from 70 to 160° C. (for example, from 80 to 150° C.), or may be approximately from 100 to 160° C. (for example, from 105 to 155° C.) and preferably from 120 to 150° C. (for example, from 125 to 150° C.). If the glass transition temperature is too high, the melt-kneadability with the water-soluble matrix and the dispersibility of the thermoplastic resin may decrease, and if the glass transition temperature is too low, uniformity of the form of the resin particles may decrease.

The water-soluble matrix can uniformly disperse the resin in particulate form even if the resin content (or the ratio of the resin to the water-soluble matrix) is high. Thus, a weight ratio of the resin (or resin particles), such as the thermoplastic resin, to the water-soluble matrix can be selected in a wide range of the former/the latter=approximately from 1/99 to 70/30 (for example, from 10/90 to 60/40), and may typically be approximately from 20/80 to 50/50 (for example, from 25/75 to 50/50), preferably from 30/70 to 50/50 (for example, from 35/65 to 45/55), and more preferably from 40/60 to 50/50 (for example, from 45/55 to 50/50), or may be approximately from 40/60 to 49/51. If the ratio of the water-soluble matrix is too large, the productivity of the resin particles may decrease, and conversely if the proportion is too small, production of resin particles having a small particle diameter may be difficult.

In addition, the water-soluble matrix and/or the resin (such as the thermoplastic resin) may contain an additive of various types, for example, such as a filler, a stabilizer (such as a heat-resistant stabilizer, a weather-resistant stabilizer, an antioxidant, and an ultraviolet absorber), a colorant, a plasticizer, a dispersant, a preservative, an anti-foaming agent, a lubricant, a flame retardant, and an antistatic agent. These additives may be used alone or in combination of two or more types. A ratio of each additive or a total ratio of additives may be, for example, 10 parts by weight or less (for example, approximately from 0.01 to 10 parts by weight) relative to 100 parts by weight of the water-soluble matrix or the resin.

In the melt-kneading, the resin (a hot-melt resin, particularly a thermoplastic resin) is forcibly emulsified and can be dispersed in particulate form in the matrix by kneading or melt-kneading with the water-soluble matrix.

The kneading or the melt-kneading can be performed by premixing the water-soluble matrix and the resin as necessary, and using a commonly used kneader (for example, such as a single-screw or twin-screw extruder, a kneader, a calender roll, and a Banbury mixer). A kneading temperature (for example, a cylinder temperature of the extruder) can be selected, for example, from a temperature equal to or higher than the melting point or glass transition temperature of the resin, for example, a range approximately from 90 to 350° C. (for example, from 100 to 330° C.), and may typically be approximately from 120 to 320° C., preferably from 150 to 310° C. (for example, from 170 to 300° C.), and more preferably from 180 to 280° C. The melt-kneading temperature of the polyamide-based resin can also be selected from a range approximately from 200 to 350° C. (for example, from 230 to 350° C.) according to the type of polyamide-based resin and may be, for example, approximately from 240 to 350° C., preferably from 250 to 320° C., and more preferably from 260 to 300° C. Unlike an aqueous medium containing an oligosaccharide and a saccharide, probably because the modified PVA-based resin and the saccharide form a miscible system in the water-soluble matrix, scorching of the saccharide during the kneading process can be prevented. A kneading time may be, for example, approximately from 10 seconds to 1 hour.

In an embodiment of the present invention, a melt-kneaded product (a pre-dispersion or a pre-molded article) can be effectively formed through a kneader probably because a large amount of the melt-kneaded product is entangled with a screw or a blade of the kneader. For example, a large amount of the melt-kneaded product is entangled with a screw of the extruder, and thus the discharge rate from the extruder can be increased. Furthermore, the kneaded product from the extruder can be molded into the form of pellets, which can improve the handleability of the molded article (a pre-molded article in which resin particles are dispersed). Thus, the water-soluble matrix is suitable for dispersing the resin in particulate form by melt-kneading to produce a wide range of resin particles.

The melt-kneaded product is typically cooled (gradually cooled or rapidly cooled), and the water-soluble matrix of the formed pre-molded article (or dispersion) is eluted with an aqueous solvent and removed in the matrix removing. The water-soluble matrix only needs to be eluted or removed by bringing the pre-molded article (or dispersion) into contact with an aqueous solvent and can be typically eluted or removed by mixing and washing the pre-molded article (or dispersion) with an aqueous solvent while applying shear force or stirring force. The aqueous solvent may contain a water-soluble organic solvent, such as an alcohol (such as ethanol) or a water-soluble ketone (such as acetone), but typically water is often used. The water-soluble matrix may be warmed and eluted as necessary.

In this matrix removing, the modified PVA-based resin containing a saccharide can greatly improve an elution rate of the water-soluble matrix as described above. Thus, this can also improve the production efficiency of the resin particles.

The resin particles can be formed by removing the matrix from the pre-molded article, and the formed resin particles can be collected by a commonly used solid-liquid separation method, such as filtration and centrifugation.

For the collected resin particles, the moisture content of the resin particles may be adjusted as necessary in the moisture controlling. That is, the resin particles may be dried, and the moisture content may be adjusted to, for example, approximately 0.1 to 5 wt. % (for example, 0.5 to 3 wt. %) according to the application of the resin particles. Specifically, the moisture content of the polyamide resin particles may be adjusted to, for example, approximately 0.5 to 2.5 wt. % (for example, 0.5 to 2 wt. %), preferably 0.55 to 2 wt. % (for example, 0.8 to 1.5 wt. %), more preferably 0.6 to 1.5 wt. % (for example, 0.65 to 1 wt. %), and particularly 0.7 to 0.8 wt. %. The moisture content can be measured by a commonly used method, such as Karl Fischer method, a thermal analysis method, or a trace moisture measurement device equipped with a moisture vaporizing device. In addition, if the crystalline thermoplastic resin is excessively heated or heated for a long time, crystallization may proceed. Thus, the crystalline thermoplastic resin particles may be subjected to controlled heating or drying conditions (for example, dried at a temperature below the glass transition temperature Tg (for example, a temperature equal to or lower than (Tg-30° C.) and a humidity approximately from 40 to 90% RH) to prevent increase in crystallinity of the resin particles and adjust the crystallinity to the above range. Such resin particles (for example, such as polyamide-based resin particles) whose moisture content or crystallinity is adjusted are useful for improving a toughness of a cured product of a fiber-reinforced composite material, for example, such as an epoxy resin composition containing reinforcing fibers, such as carbon fibers.

A shape of the resulting resin particles only needs to be particulate and may be, for example, spherical or odd shape (such as ellipsoidal, polygonal, prismatic, cylindrical, rod-like, or indefinite shape). The resin particles may also be porous particles, coated particles, or the like. The preferred form of the resin particles is spherical. The spherical particles include not only true spherical particles but also particles having a shape similar to the true spherical shape, for example, particles having a shape whose major axis and minor axis are nearly the same, for example, the major axis/the minor axis=approximately from 1.5/1 to 1/1, preferably from 1.3/1 to 1/1 (for example, from 1.2/1 to 1/1), and more preferably from 1.1/1 to 1/1. In addition, a surface of the resin particles may have unevenness, but preferably the surface is smooth, and the surface smoothness is high.

An average particle size (volume average particle size) of the resin particles is not particularly limited and may be selected from a range approximately from 0.1 to 1000 μm (for example, from 0.5 to 500 μm) according to the application and may be, for example, approximately from 1 to 300 μm, preferably from 3 to 150 μm, and more preferably 5 μm or greater (for example, from 5 to 100 μm). More specifically, an average particle diameter (average particle size) of the polyamide-based resin particles may be, for example, approximately from 1 to 100 μm (for example, from 3 to 80 μm), preferably from 5 to 100 μm (for example, from 7 to 80 μm), and more preferably from 10 to 75 μm (for example, from 15 to 70 μm). The average particle size is expressed by the volume average primary particle size and can be measured by laser diffraction scattering method or the like. A form (such as a particle shape and an average particle size) of the resin particles obtained by eluting the matrix typically has the form of the resin particles dispersed in the matrix.

A specific surface area of the resin particles according to BET method is not particularly limited and may be, for example, approximately from 0.08 to 12 $m^2/g$ (for example, from 0.15 to 6 $m^2/g$) and preferably from 0.2 to 3 $m^2/g$ (for example, from 0.3 to 2 $m^2/g$) according to the average particle size.

Furthermore, the polyamide-based resin particles may have an exothermic peak in a temperature range between the glass transition temperature and the melting point (for example, at a temperature higher than the glass transition temperature by approximately 1 to 70° C., preferably 1 to 60° C., and more preferably 1 to 50° C. (for example, 1 to 40° C.)) when the temperature is increased at a rate of 10° C./min by differential scanning calorimetry (DSC). The polyamide-based resin particles having such thermal properties (a crystal structure) can improve a toughness of a cured product of a fiber-reinforced composite material and a reinforcing effect of reinforcing fibers.

EXAMPLES

Hereinafter, the present invention will be described in more detail based on examples, but the present invention is not limited by these examples. Abbreviations for materials used in the Examples and Comparative Examples, and evaluation items and evaluation methods thereof are as follows.

Materials
(1) Water-Soluble Matrix
Modified PVA-based resin: A modified PVA-based resin was prepared as follows.
Production of Modified PVA-Based Resin To a reactor equipped with a reflux condenser, a dripping device, and a stirrer, 14 parts by weight of vinyl acetate (14 wt. % of the total was initially charged), 29 parts by weight of methanol, and 1.68 parts by weight of 3,4-diacetyloxy-1-butene (14 wt. % of the total was initially charged) were charged, the temperature was increased under a nitrogen stream while stirring, and after the boiling point was reached, 0.093 parts by weight of acetyl peroxide was added to initiate polymerization.

Furthermore, 0.04 parts by weight of acetyl peroxide was added over 1.0 hour from the initiation of the polymerization.

Moreover, 1.0 hours after the initiation of the polymerization, 86 parts by weight of vinyl acetate and 10.32 parts by weight of 3,4-diacetyloxy-1-butene were added dropwise at the same speed over 19.7 hours. When the polymerization rate of vinyl acetate reached 93%, a predetermined amount of m-dinitrobenzene was added to terminate the polymerization. Next, the unreacted vinyl acetate monomer was removed out of the system by distillation while blowing methanol vapor, and a solution of a copolymer in methanol was obtained.

Then, the solution of the above copolymer was diluted with methanol and adjusted to a solid concentration of 50 wt. %. This methanol solution was charged in a kneader, and a methanol solution containing sodium hydroxide in an amount of 2 wt. % in terms of sodium therein was added at a ratio of 8 mmol relative to 1 mol of a total amount of the vinyl acetate structural unit and the 3,4-diacetyloxy-1-butene structural unit in the copolymer while the solution temperature was kept at 35° C. to saponify the copolymer. As the saponification proceeded, the saponified product was precipitated to form particles, the above methanol solution containing 2 wt. % of sodium was further added at a ratio of 5 mmol relative to 1 mol of a total amount of the vinyl acetate structural unit and the 3,4-diacetyloxy-1-butene structural unit to saponify the copolymer. Thereafter, acetic acid for neutralization, 0.8 equivalent to sodium hydroxide, was added, and the mixture was filtered, washed adequately with methanol, dried in a hot air dryer, and a PVA-based resin including in a side chain thereof a 1,2-diol structure was obtained.

A degree of saponification of the resulting PVA-based resin including in a side chain thereof a 1,2-diol structure was 99 mol % as analyzed by alkali consumption required for hydrolysis of structural units of residual vinyl acetate and 3,4-diacetyloxy-1-butene in the resin. In addition, an average degree of polymerization was 300 as analyzed in accordance with JIS K 6726.

A content of the 1,2-diol structural unit represented by Formula (1-1) above was 5.6 mol % as calculated from an integrated value measured by $^1$H-NMR (300 MHz proton NMR, solvent DMSO-$d_6$, internal standard material: tetramethylsilane, 50° C.).

The above PVA-based resin was pelletized under the following conditions.
Extruder: 15 mm φ L/D=60, available from Technovel Corporation
Extrusion temperature: C1/C2/C3/C4/C5/C6/C7/C8/D= 100/170/180/190/200/210/220/220/210° C.
Rotation number: 200 rpm
Discharge rate: 1.5 kg/h Oligosaccharide: Starch sugar (reduced starch saccharification product PO-10, available from Towa Chemical Industry Co., Ltd.)

Sugar alcohol: D-Sorbitol LTS powder 20 M, available from Mitsubishi Shoji Foodtech Co., Ltd.

Polyethylene glycol (PEG): "Alkox R150" available from Meisei Chemical Works, Ltd.

(2) Thermoplastic Resin (A): Alicyclic polyamide-based resin, "Trogamid PACM12" available from Daicel-Evonik Ltd., melting point 247° C., terminal carboxyl group concentration (COOH group concentration) 67 mmol/kg, and terminal amino group ($NH_2$ concentration) concentration 41 mmol/kg (B): Polyamide 12 (PA12)-based resin, "Vestamid L1901" available from Daicel-Evonik Ltd., melting point 178° C., terminal carboxyl group concentration (COOH group concentration) 75 mmol/kg, and terminal amino group concentration ($NH_2$ concentration) 3 mmol/kg (C): Polyamide 12 (PA12)-based resin, "Daiamid L1640" available from Daicel-Evonik Ltd., melting point 178° C., terminal carboxyl group concentration (COOH group concentration) 130 mmol/kg, and terminal amino group concentration ($NH_2$ concentration) 4 mmol/kg.

Average Particle Diameter D50

About 1 g of the resin particles was added to 50 mL of pure water, one drop of a cleaning agent containing a surfactant ("Mamalemon (trade name)" available from Lion Corporation) was added and dispersed over 1 minute with an ultrasonic disperser ("US Cleaner" available from AS ONE Corporation). Then, the resin particles were dispersed in water, and an average particle diameter (on a volume basis) D50 was measured using a particle size distribution measuring device ("LA960" available from Horiba, Ltd.).

Crystallization Temperature, Melting Point, and Glass Transition Temperature

Crystallization temperature Tc of the water-soluble matrix, melting point Tm and glass transition temperature Tg of the polyamide-based resin were measured using a differential scanning calorimeter ("X-DSC7000" available from Seiko Instruments Inc.) as follows.

Crystallization temperature Tc: In a nitrogen atmosphere, when the temperature was increased from 20° C. to 230° C. at a temperature increase rate of 10° C./min, then maintained at 230° C. for 1 minute, and cooled at a temperature decrease rate of 10° C./min, a peak top temperature of crystallization observed was taken as the crystallization temperature Tc.

Melting point Tm of resin: In a nitrogen atmosphere, the temperature was increased from 20° C. to 280° C. at a temperature increase rate of 10° C./min, then maintained at the same temperature for 1 minute, cooled to 20° C. at a temperature decrease rate of 10° C./min, maintained at the same temperature for 1 minute, then increased at 10° C./min, and a peak top temperature of melting of the crystal observed was taken as the melting point Tm.

Glass transition temperature Tg of resin: In a nitrogen atmosphere, the temperature was increased from 20° C. to 280° C. at a temperature increase rate of 10° C./min, then maintained at the same temperature for 1 minute, cooled to 20° C. at a temperature decrease rate of 10° C./min, maintained at the same temperature for 1 minute, then increased at 10° C./min, and the glass transition temperature Tg was measured during this temperature increasing process.

Maximum Resin Concentration and Maximum Discharge Rate

The water-soluble matrix and the resin in varying weight ratios were melt-kneaded with an extruder ("TEX30" available from The Japan Steel Works, Ltd.). The melt-kneaded product was extruded from a die and cooled, and then each kneaded product was washed with water, thereby determining a maximum resin concentration at which the resin was obtained in the form of resin particles (powder).

If the maximum resin concentration is exceeded, the water solubility is extremely lowered, thereby forming oddly shaped resin particles, such as elongated particles, and aggregates of resin particles. Thus, the maximum resin concentration (a maximum concentration at which true spherical resin particles are generated) was determined by judging whether or not oddly shaped resin particles or aggregates of resin particles were formed.

A composition corresponding to the maximum resin concentration (the composition containing the water-soluble matrix and the resin) was melt-kneaded with an extruder. The melt-kneaded product was extruded from a die in varying discharge rates and cooled, and then each kneaded product was washed with water, thereby determining a maximum discharge rate at which the resin is obtained in the form of resin particles (powder). If the maximum discharge rate is exceeded, oddly shaped resin particles, such as elongated particles, and aggregates of resin particles are formed.

Carboxyl Group Concentration and Amino Group Concentration

The terminal carboxyl group concentration (COOH group concentration) and the terminal amino group concentration ($NH_2$ concentration) were measured for the polyamide-based resin as the thermoplastic resin and the resulting polyamide-based resin particles by the following titration method.

Carboxyl group concentration: A sample of the polyamide resin was dissolved in benzyl alcohol to prepare a 1 wt. % benzyl alcohol solution, and the carboxyl group concentration was measured by neutralization titration with 1/100 N KOH aqueous solution.

Amino group concentration: A sample of the polyamide resin was dissolved in a mixed solvent of phenol and ethanol at a volume ratio of 10:1 to prepare a 1 wt. % solution, and the amino group concentration was measured by neutralization titration with 1/100 N HCl aqueous solution.

Example 1

The modified PVA-based resin and the sugar alcohol were melt-mixed in ratios shown in Table 1 to examine an elution property of the water-soluble matrix in water. That is, a sheet having a thickness of 1 mm was prepared from the above melt-mixed product, a sample of a predetermined size (1 cm×1 cm) was cut out therefrom, and a weight of the sample was measured. In a screw tube (volume 50 mL), 20 mL of pure water was added using a pipette, and a stirring bar was placed. Then, the temperature was increased to a predetermined temperature while stirring pure water with the stirring bar at 700 rpm. Immediately after the predetermined temperature was reached, the sample (about 0.12 to 0.13 g) was added into the screw tube, and time (dissolution time) from the addition of the sample to disappearance of the sample due to dissolution was measured. Then, dissolution time per 0.1 g of the sample was calculated to plot a dissolution curve with "EXCEL" (Microsoft Corporation). The results are illustrated in FIG. 1.

As can be seen from FIG. 1, the addition of even only a small amount of saccharide significantly improves the elution property of the water-soluble matrix. In addition, when the water temperature was increased to 80° C., a temperature equal to or higher than the glass transition temperature of the modified PVA-based resin, the dissolution time was significantly reduced, but the solubility behavior exhibited the same tendency as the solubility at 40° C.

Example 2

(1) Crystallization Temperature of Water-Soluble Matrix

In a nitrogen atmosphere, 50 parts by weight of the modified PVA-based resin and 50 parts by weight of the sugar alcohol were melt-mixed at 230° C. to prepare a water-soluble matrix. A crystallization temperature Tc of the resulting water-soluble matrix was measured to be 118° C., and only one endothermic peak was observed. Thus, it was determined that the water-soluble matrix formed a completely miscible system.

(2) Maximum Resin Concentration

The above water-soluble matrix (the modified PVA-based resin/the sugar alcohol=50/50 (weight ratio)) and the alicyclic polyamide resin (A) in varying weight ratios were melt-kneaded (at a cylinder temperature of 270° C.) with an extruder ("TEX30" available from The Japan Steel Works, Ltd.). A maximum resin concentration (maximum resin content) as determined by extruding the melt-kneaded product from a die was 49 wt. %.

Then, in correspondence with the maximum resin concentration of 49 wt. % of the resin (A), 51 parts by weight of the water-soluble matrix component (25.5 parts by weight of the modified PVA-based resin and 25.5 parts by weight of the sugar alcohol) and 49 parts by weight of the resin (A) were melt-kneaded (at a cylinder temperature of 270° C.) with the above extruder. When extruded from a die, the melt-kneaded product was able to be discharged at a maximum discharge rate of 25 kg/h. The extruded melt-kneaded product was cooled and cut, and a pre-molded article in the form of pellets was obtained. This pre-molded article was added to water and stirred to elute the water-soluble matrix. The formed resin particles were filtered with a glass filter and collected, then dried naturally at a temperature of 23° C. and a humidity of 50% RH, and polyamide resin particles (powder) were obtained. The resulting polyamide resin particles were true spherical, and the average particle diameter was 38 μm.

Example 3

Polyamide resin particles were produced in the same manner as in Example 2 with the exception that the water-soluble matrix was prepared at a ratio of the modified PVA-based resin/the sugar alcohol=80/20 (weight ratio). A crystallization temperature Tc of the water-soluble matrix was 143° C., a maximum resin concentration of the resin (A) was 48 wt. %, and a maximum discharge rate was 25 kg/h. In addition, the resulting polyamide resin particles were true spherical, and the average particle diameter was 23 μm.

Example 4

Polyamide resin particles were produced in the same manner as in Example 2 with the exception that the water-soluble matrix was prepared at a ratio of the modified PVA-based resin/the sugar alcohol=95/5 (weight ratio). A crystallization temperature Tc of the water-soluble matrix was 150° C., a maximum resin concentration of the resin (A) was 49 wt. %, and a maximum discharge rate was 25 kg/h. In addition, the resulting polyamide resin particles were true spherical, and the average particle diameter was 10 μm.

Example 5

Polyamide resin particles were produced in the same manner as in Example 2 with the exception that the water-soluble matrix was prepared at a ratio of the modified PVA-based resin/the sugar alcohol=90/10 (weight ratio), the polyamide 12-based resin (B) was used in place of the resin (A), and the melt-kneading temperature (a cylinder temperature) was set at 230° C. A crystallization temperature Tc of the water-soluble matrix was 147° C., a maximum resin concentration of the resin (B) was 41 wt. %, and a maximum discharge rate was 30 kg/h. In addition, the resulting polyamide resin particles were true spherical, and the average particle diameter was 12 μm.

Comparative Example 1

Polyamide resin particles were produced in the same manner as in Example 2 with the exception that polyethylene glycol (PEG) was used in place of the water-soluble matrix of Example 2, and polyethylene glycol (PEG) and the alicyclic polyamide resin (A) were used at a ratio of 51 parts by weight of the former and 49 parts by weight of the latter. A crystallization temperature Tc of polyethylene glycol was 42° C., and a melt kneaded product was discharged from a die of the extruder at a discharge rate of 25 kg/h, but it became a rice cake-like mass, which was difficult to be collected. In addition, the resulting polyamide resin particles were oddly shaped (thready), and thus the average particle diameter was not able to be accurately measured.

Comparative Example 2

A maximum resin concentration of the alicyclic polyamide-based resin
(A) was 42 wt. % as examined in the same manner as in Example 2 with the exception that polyethylene glycol (PEG) was used in place of the water-soluble matrix of Example 2. Thus, polyamide resin particles were produced in the same manner as in Example 2 at a ratio of the resin (A) and polyethylene glycol (PEG) of the former/the latter=42 parts by weight/58 parts by weight. As a result, a melt-kneaded product in a rice cake-like form was discharged from a die of the extruder at a maximum discharge rate of 10 kg/h. The resulting polyamide resin particles were true spherical, and the average particle diameter was 3 μm.

Comparative Example 3

A water-soluble matrix prepared by melt-mixing 80 parts by weight of the oligosaccharide and 20 parts by weight of the sugar alcohol was used in place of the water-soluble matrix of Example 2, and the polyamide 12-based resin (C), which has a lower glass transition temperature than that of the resin (A), was used in place of the resin (A) of Example 2. A crystallization temperature Tc of the above water-soluble matrix (an oligosaccharide composition) was not measurable.

A maximum resin concentration was 33 wt. % as examined in the same manner as in Example 2 with the exception that the water-soluble matrix (the oligosaccharide composition) and the polyamide 12-based resin (C) were used, and the melt-kneading temperature was set at 230° C. (a cylinder temperature of 230° C.).

Then, in correspondence with the maximum resin concentration of 33 wt. %, 67 parts by weight of the water-soluble matrix (53.6 parts by weight of the oligosaccharide and 13.4 parts by weight of the sugar alcohol) and 33 parts by weight of the resin (C) were melt-kneaded (at a cylinder temperature of 230° C.) with the above extruder. When extruded from a die in the same manner in Example 2, the melt-kneaded product was able to be discharged in the form of flakes at a maximum discharge rate of 15 kg/h. The resulting polyamide resin particles were true spherical, and the average particle diameter was 3 μm.

Comparative Example 4

When 75 parts by weight of the water-soluble matrix (60 parts by weight of the oligosaccharide and 15 parts by weight of the sugar alcohol) and 25 parts by weight of the alicyclic polyamide-based resin (A) were melt-kneaded (at a cylinder temperature of 270° C.) and extruded in the same manner as in Example 2, the water-soluble matrix was thermally decomposed, and the melt-kneaded product failed to be extruded from a die. That is, the water-soluble matrix containing the oligosaccharide and the sugar alcohol failed to withstand the kneading temperature for the resin (A) (the cylinder temperature of 270° C.), and the resin particles of the resin (A) failed to be produced.

The results of Examples 2 to 5 and Comparative Examples 1 to 3 are shown in Table 1 except for Comparative Example 4 in which the water-soluble matrix was decomposed.

discharge rate, achieving high productivity of the spherical resin particles. In addition, the pre-molded article can be obtained in the form of pellets, and thus the handleability thereof and the productivity of the resin particles can be improved. In particular, unlike Comparative Examples 1 and 2, the resin particles can be produced without reducing the functional group (particularly the amino group) concentration of the polyamide-based resin.

INDUSTRIAL APPLICABILITY

The resin particles according to an embodiment of the present invention can be used widely in fields of, for example, cosmetics, coating agents, paints, and molding materials. For example, the resin particles can be used as light diffusing agents, matting agents, lubricants, anti-blocking agents, cosmetics, light blocking agents, toners, fillers, ceramics void forming materials, reinforcing agents of fiber-reinforced composite materials, and the like, according to the type of resin, the average particle size, and the like. For example, resin particles having an average particle size of 5 μm or less (for example, approximately from 0.1 to 3 μm) can be used in the field of cosmetics, coating agents, paints, molding materials, and the like, resin particles having an average particle size of approximately from 5 to 40 μm (for example, from 10 to 30 μm and preferably from 15 to 25 μm) may be used in the field of fiber-reinforced composite

TABLE 1

| | | Examples | | | | Comparative Examples | | |
|---|---|---|---|---|---|---|---|---|
| | | 2 | 3 | 4 | 5 | 1 | 2 | 3 |
| Water-soluble component | Modified PVA-based resin | 50 | 80 | 95 | 90 | | | |
| | Sugar alcohol | 50 | 20 | 5 | 10 | | | 20 |
| | PEG | | | | | 100 | 100 | |
| | Oligosaccharide | | | | | | | 80 |
| | Crystallization temperature Tc (° C.) | 118 | 143 | 150 | 147 | 42 | | Not measurable |
| Resin | Type of resin | (A) | (A) | (A) | (B) | (A) | (A) | (C) |
| | Melting point Tm (° C.) | 247 | 247 | 247 | 178 | 247 | 247 | 178 |
| | COOH group concentration | 67 | 67 | 67 | 75 | 89 | 67 | 130 |
| | $NH_2$ group concentration | 41 | 41 | 41 | 3 | 19 | 41 | 4 |
| | Maximum resin concentration (wt. %) | 49 | 48 | 49 | 41 | 49 | 42 | 33 |
| | Form of extrudate | Pellets | Pellets | Pellets | Pellets | Rice cake-like mass | Rice cake-like | Flakes |
| | Maximum discharge rate (kg/h) | 25 | 25 | 25 | 30 | 25 | 10 | 15 |
| Resin particles | Shape | True spherical | True spherical | True spherical | True spherical | Thready (oddly shaped) | True spherical | True spherical |
| | Average particle size (μm) | 38 | 23 | 10 | 12 | Not measurable | 3 | 3 |
| | COOH group concentration | 69 | 63 | 67 | 76 | 90 | 89 | 128 |
| | $NH_2$ group concentration | 39 | 44 | 42 | 3 | 17 | 19 | 3 |

In the table, units of the terminal carboxyl group concentration (COOH group concentration) and the terminal amino group concentration ($NH_2$ concentration) are mmol/kg.

As is clear from the results shown in Table 1, in the examples, polyamide-based resins, which are even polyamide-based resins having a high glass transition temperature, can be melt-kneaded at a high concentration and can be discharged at a high resin content concentration and a large materials (particularly materials containing an epoxy resin), and resin particles having an average particle size approximately from 30 to 100 μm (for example, from 50 to 75 μm) may be used in the field of modeling with a 3D printer or the like.

In addition, if a predetermined amount (for example, approximately from 0.1 to 15 volume % and preferably from 0.5 to 5 volume %) of the resin particles (for example, such as crystalline aliphatic or alicyclic polyamide-based resin particles having the moisture content and the crystallinity described above) is added or impregnated as a reinforcing agent to a composition (or a prepreg) for a fiber-reinforced composite material containing an epoxy resin (such as a bisphenol A type epoxy resin), a thermosetting resin, such as a vinyl ester resin, and reinforcing fibers, such as carbon fibers and glass fibers (including fabric reinforcing fibers), and molded by a molding method, such as a hand lay-up molding method, to form a fiber-reinforced composite material FRP, a toughness of a cured product (including an interlaminar toughness of the FRP) can be improved, and the reinforcing effect of the reinforcing fibers (particularly carbon fibers) can be improved. The prepreg may contain a curing agent, such as an aromatic amine-based curing agent, and a curing accelerator, such as a phosphine and a tertiary amine.

Molded articles formed of the cured product of the composition (or the prepreg) may be exemplified by structural members (structural materials) in various fields, for example, such as vehicles (for example, such as airplanes, helicopters, rockets, automobiles, bikes, bicycles, trains, ships, and wheelchairs), artificial satellites, windmills, sporting goods (golf shafts and tennis rackets), housings (such as housings of notebook personal computers), molded products in the medical field (such as artificial bones), IC trays, fishing rods, and bridge piers.

The invention claimed is:

1. A method for producing resin particles by bringing a pre-molded article in which resin particles are dispersed in a water-soluble matrix into contact with an aqueous solvent to elute the matrix;
   wherein the water-soluble matrix comprises a water-soluble polyvinyl alcohol- based resin and a saccharide; and
   the water-soluble polyvinyl alcohol-based resin comprises a modified polyvinyl alcohol-based resin comprising a side chain comprising an alkyl group or alkyl chain, the alkyl group or alkyl chain comprising at least one hydroxyl group.

2. The method according to claim 1, wherein the alkyl group is selected from (a1) and (a2) below, and
   wherein the alkyl chain comprises (a1) and/or (a2) below:
   (a1) an alkyl group comprising a primary hydroxyl group;
   (a2) an alkyl group comprising a primary hydroxyl group and a secondary hydroxyl group.

3. The method according to claim 1, wherein the modified polyvinyl alcohol-based resin comprises a unit represented by Formula (1) below:

[Chem. 1]

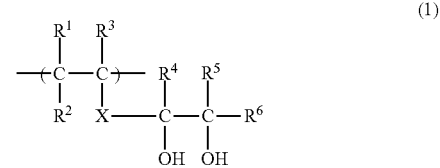

where $R^1$, $R^2$, $R^3$, $R^4$, $R^5$, and $R^6$ are the same or different and represent a hydrogen atom or an organic group; and X represents a single bond or a bonding chain.

4. The method according to claim 1, wherein the modified polyvinyl alcohol-based resin comprises in a side chain thereof a 1,2-diol structure.

5. The method according to claim 1, wherein the modified polyvinyl alcohol-based resin comprises a unit represented by Formula (1-1) below:

[Chem. 2]

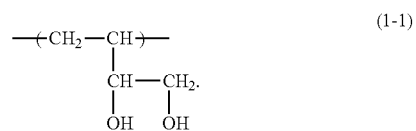

6. The method according to claim 1, wherein a weight ratio of the modified polyvinyl alcohol-based resin and the saccharide is the former/the latter=from 99/1 to 50/50.

7. The method according to claim 1, wherein the resin particles are formed of a thermoplastic resin having a glass transition temperature of 30 to 250° C.

8. The method according to any of claims 1 to 7 claim 1, wherein the resin particles are formed of a thermoplastic resin comprising at least an amino group.

9. The method according to claim 1, wherein the resin particles are polyamide-based resin particles.

10. The method according to claim 1, wherein a volume average particle size of the resin particles is 5 μm or greater.

11. The method according to claim 1, wherein a weight ratio of the resin particles and the water-soluble matrix is the former/the latter=from 10/90 to 60/40.

* * * * *